United States Patent
Zhang et al.

(10) Patent No.: US 11,610,094 B2
(45) Date of Patent: Mar. 21, 2023

(54) ENTITY PYRAMID EMBEDDINGS

(71) Applicant: Microsoft Technology Licensing, LLC, Redmond, CA (US)

(72) Inventors: Xiaowen Zhang, Dublin (IE); Benjamin Hoan Le, San Jose, CA (US); Qing Duan, Santa Clara, CA (US); Aman Grover, San Carlos, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 569 days.

(21) Appl. No.: 16/588,870

(22) Filed: Sep. 30, 2019

(65) Prior Publication Data

US 2021/0097367 A1     Apr. 1, 2021

(51) Int. Cl.
  *G06Q 10/10*     (2023.01)
  *G06Q 10/06*     (2023.01)
  *G06Q 30/08*     (2012.01)
  *G06N 3/04*      (2023.01)
  *G06Q 10/1053*   (2023.01)
  *G06N 3/08*      (2023.01)

(52) U.S. Cl.
  CPC .............. *G06N 3/04* (2013.01); *G06N 3/08* (2013.01); *G06Q 10/1053* (2013.01)

(58) Field of Classification Search
  CPC .......... G06N 3/04; G06N 3/08; G06N 3/0454; G06N 3/084; G06Q 10/1053
  USPC .................................................. 705/1.1–912
  See application file for complete search history.

(56) References Cited

U.S. PATENT DOCUMENTS

| | | | |
|---|---|---|---|
| 2018/0173803 A1* | 6/2018 | Grover | G06Q 10/1053 |
| 2018/0336241 A1* | 11/2018 | Noh | G06F 16/242 |
| 2019/0095788 A1* | 3/2019 | Yazdani | G06N 3/0454 |
| 2020/0193382 A1* | 6/2020 | Michaels | G06F 40/289 |
| 2020/0210957 A1* | 7/2020 | Gaspar | G06N 3/0454 |

OTHER PUBLICATIONS

Qingxin Meng, Hengshu Zhu, Keii Xiao, Le Zhang, and Hui Xiong, "A Hierarchical Career-Path-Aware Neural Network for Job Mobility Prediction," KDD '19: Proceedings of the 25th ACM SIGKDD International Conference on Knowledge Discovery & Data Mining, Jul. 2019, pp. 14-24. (Year: 2019).*

* cited by examiner

*Primary Examiner* — Jonathan P Ouellette
(74) *Attorney, Agent, or Firm* — Schwegman, Lundberg & Woessner, P.A.

(57) ABSTRACT

The disclosed embodiments provide a system for processing data. During operation, the system performs processing related to a first set of features for a first entity using a first series of embedding layers, wherein the processing includes applying each embedding layer in the first series of embedding layers to a concatenation of all outputs of one or more layers preceding the embedding layer. Next, the system obtains a first embedding as an output of a first final layer in the first series of embedding layers. The system then outputs the first embedding for use by a machine learning model.

15 Claims, 5 Drawing Sheets

ENTITY PYRAMID EMBEDDINGS

BACKGROUND

Field

The disclosed embodiments relate to embedding models. More specifically, the disclosed embodiments relate to pyramid embeddings for entities.

Related Art

Analytics is commonly used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

To glean such insights, large data sets of features may be analyzed using regression models, artificial neural networks, support vector machines, decision trees, naïve Bayes classifiers, and/or other types of machine learning models. The discovered information may then be used to guide decisions and/or perform actions related to the data. For example, the output of a machine learning model may be used to guide marketing decisions, assess risk, detect fraud, predict behavior, and/or customize or optimize use of an application, website, or computer system.

Consequently, machine learning and/or analytics may be facilitated by mechanisms for improving the creation, profiling, management, sharing, and reuse of features and/or machine learning models.

BRIEF DESCRIPTION OF THE FIGURES

In the figures, like reference numerals refer to the same figure elements.

DETAILED DESCRIPTION

Figure 1:
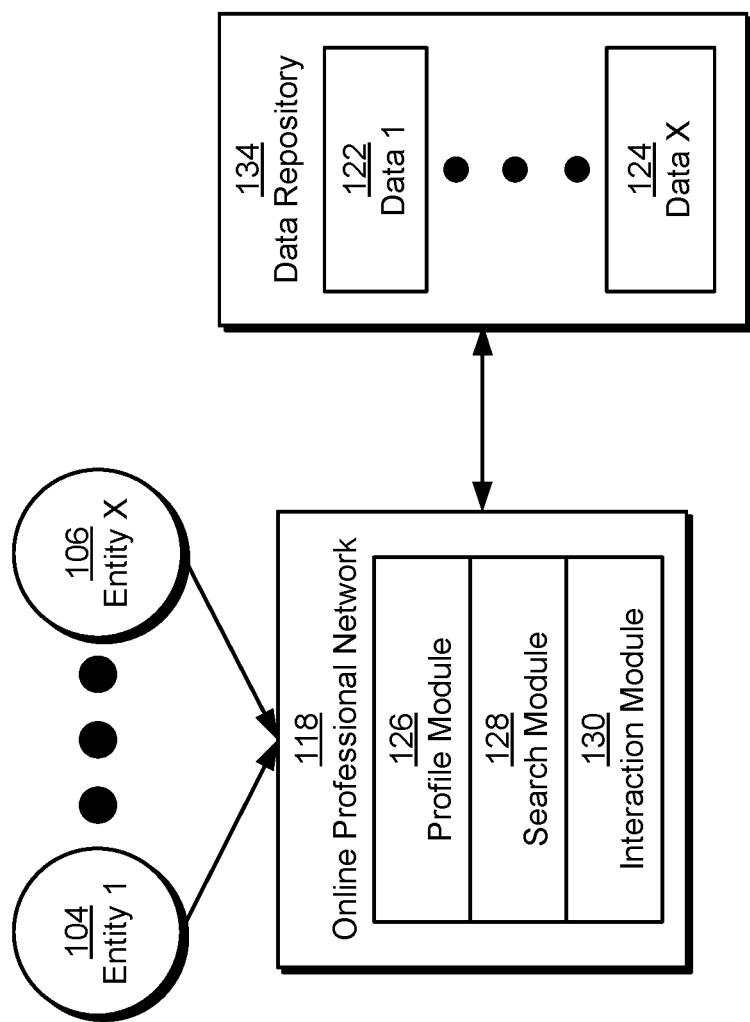
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for generating and using embeddings for entities. The entities include users, companies, jobs, posts, advertisements, groups, items, products, services, locations, search results, and/or other types of entities represented within an online system. Each embedding represents a mapping of the behavior, history, characteristics, preferences, and/or other attributes of a corresponding entity to a vector in a lower-dimensional latent space.

More specifically, the disclosed embodiments provide a method, apparatus, and system for generating embeddings for entities using a machine learning model with a "pyramid" architecture. The pyramid architecture includes a series of embeddings layers in a neural network. Within the embedding layers, the input to a given layer includes the concatenated outputs of all preceding layers. For example, the neural network includes a series of three fully connected embedding layers. The input to the second embedding layer includes a concatenation of the output of the first embedding layer with the output of the layer preceding the first embedding layer (e.g., an input layer in the neural network). The input to the third embedding layer includes a concatenation of the output of the second embedding layer with the output of the first embedding layer and the output of the layer preceding the first embedding layer. The successive increase in the size of the input to each subsequent embedding layer results in a "pyramid" shape for the input.

The machine learning model also includes an input layer that converts a set of entity features into fixed-length input embeddings that can be subsequently combined by the embedding layers into a single output embedding for the corresponding entity. To improve the efficiency of the input layer, the dimensionality of a given input embedding is selected to be proportional to the cardinality of the feature used to produce the input embedding. For example, the input layer generates input embeddings as fixed-length vector representations of one-hot encoded categorical entity features such as skills, companies, titles, educational attributes (e.g., degrees, schools, fields of study, etc.), seniorities, and/or functions of members or jobs. An entity feature for skills includes tens of thousands of possible values, which are converted into an input embedding with a dimensionality in the hundreds. On the other hand, an entity feature for seniority includes around 10 values, which are converted into an input embedding with a dimensionality of around 4.

Embeddings generated in this way can then be used with additional layers and/or machine learning models to represent relationships, preferences, affinities, and/or interactions between or among entities. For example, features for a member and a job are inputted into two separate sets of embedding layers, and separate embeddings for the member and job are obtained as output from the two sets of embedding layers. The embeddings are inputted into one or more additional prediction layers, and weights of all layers are updated so that the output of the prediction layers reflects an outcome associated with the member and job (e.g., a response by the member to a recommendation of the job). As training is performed using the features and corresponding outcomes, weights of the embedding layers are also updated so that a measure of distance between the member and job embeddings reflects the outcome.

By structuring a series of embedding layers in a machine learning model so that the input to one embedding layer includes the concatenated output from all previous layers, the disclosed embodiments allow the embedding layers to perform wide learning across various combinations of embedded representations of the input features, as well as deep learning across the embedding layers. As a result, embeddings outputted by the machine learning model encode additional information that improves the accuracy of subsequent inference using the embeddings. Moreover, the generation of input embeddings with dimensionalities that are proportional to the cardinalities of the corresponding features allows the size of the input embeddings to scale with the complexity of the features.

In contrast, conventional techniques generate embeddings using deep learning architectures, in which the input to a layer includes only the output of the preceding layer. Such embeddings lack information that can be learned from recursively analyzing outputs from all layers, which in turn reduces the predictive capabilities of models that subsequently use the embeddings to perform inference. The conventional techniques also, or instead, generate embeddings of the same length from all types of features instead of selecting embedding lengths based on the dimensionalities of the features. The conventional techniques thus consume additional computational, memory, storage, and/or other resources during generation of embeddings from lower-cardinality attributes and/or produce embeddings that fail to encode the complexity of higher-cardinality attributes. Consequently, the disclosed embodiments improve computer systems, applications, user experiences, tools, and/or technologies related to generating embeddings, recommendation systems, feature engineering, and/or machine learning.

Entity Pyramid Embeddings

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may log searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

For example, data in data repository 134 and one or more machine learning models are used to produce rankings of candidates for jobs or opportunities listed within or outside online network 118. The candidates include users who have viewed, searched for, or applied to jobs, positions, roles, and/or opportunities, within or outside online network 118. The candidates also, or instead, include users and/or members of online network 118 with skills, work experience, and/or other attributes or qualifications that match the corresponding jobs, positions, roles, and/or opportunities.

After the candidates are identified, profile and/or activity data of the candidates are inputted into the machine learning model(s), along with features and/or characteristics of the corresponding opportunities (e.g., required or desired skills, education, experience, industry, title, etc.). The machine learning model(s) output scores representing the strength of the candidates with respect to the opportunities and/or qualifications related to the opportunities (e.g., skills, current position, previous positions, overall qualifications, etc.). The machine learning model(s) also, or instead, generate scores representing the candidates' level of interest in the opportunities. For example, the machine learning model(s) generate scores based on similarities between the candidates' profile data with online network 118 and descriptions of the opportunities. The model(s) optionally adjust the scores based on social and/or other validation of the candidates' profile data (e.g., endorsements of skills, recommendations, accomplishments, awards, etc.).

In turn, rankings based on the scores and/or associated insights improve the quality of the candidates and/or recommendations of opportunities to the candidates, increase user activity with online network 118, and/or guide the decisions of the candidates and/or moderators involved in screening for or placing the opportunities (e.g., hiring managers, recruiters, human resources professionals, etc.). For example, one or more components of online network 118 display and/or otherwise output a member's position (e.g., top 10%, top 20 out of 138, etc.) in a ranking of candidates for a job to encourage the member to apply for jobs in which the member is highly ranked. In a second example, the component(s) account for a candidate's relative interest and/or strength with respect to a set of jobs during ordering of the jobs as search results and/or job recommendations that are subsequently displayed to the candidate. In a third example, the component(s) recommend highly ranked candidates for a position to recruiters and/or other moderators as potential applicants and/or interview candidates for the position. In a fourth example, the component(s) recommend jobs to a candidate based on the predicted relevance or attractiveness of the jobs to the candidate and/or the candidate's likelihood of applying to the jobs.

Figure 2:
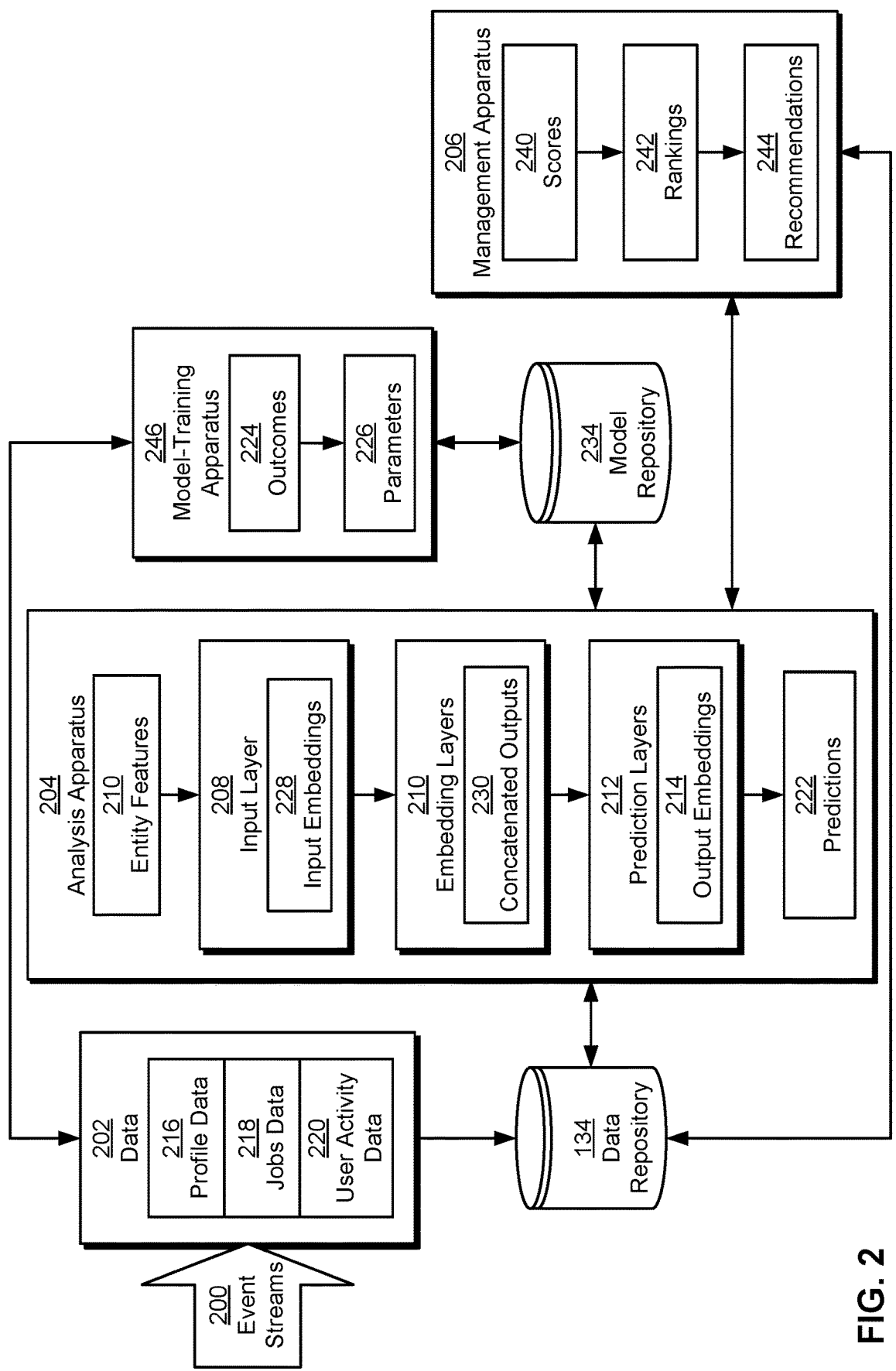
FIG. 2 shows a system for processing data in accordance with the disclosed embodiments.

In one or more embodiments, online network 118 includes functionality to improve inferences, personalization, and/or recommendations related to candidates, jobs, companies, schools, content, and/or other entities in online network 118 by generating embeddings representing behavior, preferences, characteristics, and/or other attributes related to the entities. As shown in FIG. 2, data repository 134 and/or another primary data store may be queried for data 202 that includes profile data 216 for members of an online system (e.g., online network 118 of FIG. 1), as well as activity data 218 that tracks activity by or related to the members within and/or outside the online system.

Profile data 216 includes data associated with member profiles in the platform. For example, profile data 216 for an online professional network includes a set of attributes for each user, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Profile data 216 also includes a set of groups to which the user belongs, the user's contacts and/or connections, awards or honors earned by the user, licenses or certifications attained by the user, patents or publications associated with the user, and/or other data related to the user's interaction with the platform.

Attributes of the members are optionally matched to a number of member segments, with each member segment containing a group of members that share one or more common attributes. For example, member segments in the platform may be defined to include members with the same industry, title, location, and/or language.

Connection information in profile data 216 is optionally combined into a graph, with nodes in the graph representing entities (e.g., users, schools, companies, locations, etc.) in the platform. Edges between the nodes in the graph represent relationships between the corresponding entities, such as connections between pairs of members, education of members at schools, employment of members at companies, following of a member or company by another member, business relationships and/or partnerships between organizations, and/or residence of members at locations.

Jobs data 218 includes structured and/or unstructured data for job listings and/or job descriptions that are posted or provided by members of the online system. For example, jobs data 218 for a given job or job listing include a declared or inferred title, company, required or desired skills, responsibilities, qualifications, role, location, industry, seniority, salary range, benefits, and/or member segment.

User activity data 220 includes records of user interactions with one another and/or content associated with the platform. For example, user activity data 220 tracks impressions, clicks, likes, dislikes, shares, hides, comments, posts, updates, conversions, and/or other user interaction with content in the platform. User activity data 220 also, or instead, tracks other types of activity, including connections, messages, job applications, job searches, recruiter searches for candidates, interaction between candidates 116 and recruiters, and/or interaction with groups or events. In some embodiments, user activity data 220 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User activity data 220 additionally includes schedules, calendars, and/or upcoming availabilities of the users, which may be used to schedule meetings, interviews, and/or events for the users. Like profile data 216, user activity data 220 is optionally used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

In one or more embodiments, profile data 216, jobs data 218, user activity data 220, and/or other data 202 in data repository 134 is standardized before the data is used by components of the system. For example, skills in profile data 216 and/or jobs data 218 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online system. In a fifth example, data repository 134 includes standardized time periods (e.g., daily, weekly, monthly, quarterly, yearly, etc.) that can be used to retrieve profile data 216, jobs data 218, user activity data 220, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform. One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis.

In one or more embodiments, the system of FIG. 2 includes functionality to perform inference based on output embeddings 214 of entities in the online system. For example, the system of FIG. 2 generates predictions 222 representing interactions, relationships, preferences, associations, and/or affinities between or among members, jobs, content, advertisements, companies, schools, goods, services, and/or other entities in the online system based on embeddings 214 of entity features 210 for the entities.

To generate predictions 222 related to one or more entities, an analysis apparatus 204 inputs entity features 210 for the entities into layers of one or more machine learning models. As shown in FIG. 2, the layers include an input layer 208, one or more embedding layers 210, and one or more prediction layers 212.

Input layer 208 converts a set of entity features 210 for each entity into a set of input embeddings 228. For example, input layer 208 generates input embeddings 228 as fixed-length vector representations of one-hot encoded categorical entity features 210 such as skills, companies, titles, educational attributes (e.g., degrees, schools, fields of study, etc.), seniorities, and/or functions of members or jobs in the online system.

In one or more embodiments, analysis apparatus 204 sets the dimensionality of an input embedding produced by input layer 208 to be proportional to the cardinality of the feature from which the input embedding is produced. For example, analysis apparatus 204 uses the following formula to calculate the dimensionality of an input embedding for a given feature:

$$d_{dense} = \lfloor K^*(d_{sparse})^r \rfloor, K \in R^+, r \in (0,1)$$

In the above formula, $d_{dense}$ represents the dimensionality of the input embedding, and $d_{sparse}$ represents the dimensionality (or cardinality) of the feature used to generate the input embedding. K represents a positive real number, and r is a value between 0 and 1, excluding 0 and 1. Both K and r are hyperparameters that can be tuned based on the dimensionality of the input bedding and the computational tolerance of the system. Using the above formula, a "skill" feature with a cardinality of tens of thousands can be converted into an input embedding with a dimensionality in the hundreds. Conversely, a "seniority" feature with a cardinality of around 10 can be converted into an input embedding with a dimensionality of around 4.

Next, analysis apparatus 204 uses a series of embedding layers 208 to process input embeddings 228 and generate one or more output embeddings 214 for each entity. In some embodiments, embedding layers 208 include a series of layers in a neural network, in which the input to each layer is a set of concatenated outputs 212 from previous layers in the neural network. The successive increase in the size of the input to each subsequent embedding layer results in a "pyramid" shape for the input.

For example, the neural network includes a series of three fully connected embedding layers 208. The input to the first embedding layer includes input embeddings 228 outputted by input layer 208. The input to the second embedding layer includes a concatenation of the output of the first embedding layer with input embeddings 228 produced by input layer 208. The input to the third embedding layer includes a concatenation of the output of the second embedding layer with the output of the first embedding layer and input embeddings 228 outputted by input layer 208.

Analysis apparatus 204 uses output embeddings 214 produced by embedding layers 210 as input into one or more prediction layers 212 and obtains predictions 222 related to the corresponding entities as output from prediction layers 212. For example, analysis apparatus 204 includes output embeddings 214 and/or additional features (e.g., features obtained or derived from profile data 216 and/or activity data 218) for one or more members, jobs, companies, content items, and/or other types of entities into prediction layers 212. Prediction layers 212 include a first layer that uses a Hadamard product, cross product, cosine similarity, and/or another operation to combine multiple output embeddings 214 into a vector, matrix, or scalar value. Prediction layers 212 also include one or more additional layers that perform additional processing on the vector, matrix, or scalar value to generate a score representing a predicted class, likelihood, preference, relationship, affinity, outcome, or other attribute between or among the entities. Using machine learning models to generate predictions based on embeddings of entity features is described in further detail below with respect to FIG. 3.

A model-training apparatus 246 trains the machine learning models to generate predictions 222 based on entity features 210, output embeddings 214, and/or outcomes 224 associated with the corresponding entities. First, model-training apparatus 246 obtains outcomes 224 as positive or negative labels associated with pairs of entities. A positive label represents a positive outcome between a pair of entities (e.g., sending a connection request, accepting a connection request, applying to a job, clicking on a recommendation, paying for a good or service, etc.), while a negative label represents a negative outcome between a pair of entities (e.g., ignoring or rejecting a connection request, dismissing a recommendation, dismissing a job, hiding a content item, etc.).

Next, model-training apparatus 246 uses a training technique and/or one or more hyperparameters to update parameters 226 of a machine learning model so that the machine learning model learns to predict outcomes 224 based on the entity features 210 and/or output embeddings 214. For example, model-training apparatus 246 performs backpropagation and gradient descent on parameters 226 in input layer 208, embedding layers 210, and/or prediction layers 212 to reduce the error between predictions 222 and the corresponding outcomes 224.

In one or more embodiments, model-training apparatus 246 adjusts the size of a given update to parameters 226 based on weights associated with outcomes 224. For example, outcomes 224 associated with members and jobs include positive outcomes and negative outcomes. The positive outcomes include, but are not limited to, applying to a job and/or saving a job. The negative outcomes include, but are not limited to, skipping a job in a list of job search results or recommendations to perform an action on another job, ignoring a job after viewing the job one or more times, and/or dismissing a job. Each type of outcome is assigned a weight that represents the "magnitude," severity, or significance of the outcome. Thus, applying to a job is associated with a weight of +1, saving a job is associated with a weight of +0.5, skipping and ignoring a job are associated with the same weight of −1, and dismissing a job is associated with a weight of −10.

Continuing with the above example, model-training apparatus 246 trains a deep learning model that generates predictions 222 based on entity features 210, input embeddings 228, concatenated outputs 230, and/or output embeddings 214 by scaling updates to parameters 226 in a way that is proportional to weights for the corresponding outcomes 224. As a result, an update to parameters 226 to improve a prediction of an outcome indicating dismissal of a job is associated with a learning rate or step size that is ten times greater than an update to parameters 226 to improve a prediction of an outcome indicating ignoring a job.

In turn, the machine learning model learns to generate output embeddings 214 from entity features 210 in a way that reflects outcomes 224 associated with the corresponding entities. For example, the machine learning model generates one embedding from features for a member and another embedding from features for a job. After the machine learning model is trained, the machine learning model is able to use the embeddings to output a prediction representing the member's likelihood of having a positive interaction with a job. As a result, the machine learning model learns to generate output embeddings 214 that are close to one another in a vector space when the corresponding member-job pairs are associated with positive outcomes 224 (e.g., a member applying to and/or saving a job). Conversely, the machine learning model learns to generate embeddings 220 of that are farther apart in the vector space when the corresponding member-job pairs are associated with negative outcomes 224 (e.g., a member ignoring and/or dismissing a job).

After a machine learning model is created and/or updated, model-training apparatus 246 stores parameters 226 of the machine learning model in a model repository 234. For example, model-training apparatus 246 replaces old values of parameters 226 in model repository 234 with the updated parameters 226, or model-training apparatus 246 stores the updated parameters 226 separately from the old values (e.g., by storing each set of parameters 226 with a different version number of the corresponding model). Model-training apparatus 246 also, or instead, provides the latest parameters 226 to analysis apparatus 204 and/or another component of the system for subsequent use in generating output embeddings 214 and/or predictions 222 from a corresponding set of entity features 210.

In turn, analysis apparatus 204 and/or other components of the system use parameters 226 and/or output of the machine learning model to perform additional processing and/or inference related to the entities. For example, analysis apparatus 204 uses input layer 208 and embedding layers 210 to generate output embeddings 214 from entity features 210 for a set of members, jobs, and/or other entities. Analysis apparatus 204 stores output embeddings 214 as representations of the corresponding entities in data repository 134 and/or another data store. The stored output embeddings 214 can be used by other machine learning models and/or components to perform additional processing and/or inference related to the entities instead of requiring the components to generate output embeddings 214 from entity features 210 every time output embeddings 214 are used. Analysis apparatus 204 also, or instead, obtains output embeddings 214 from the machine learning model and/or data repository 134 and applies a collaborative filtering and/or matrix factorization technique to generate additional predictions 222 and/or inferences related to the corresponding entities.

A management apparatus 206 uses output from analysis apparatus 204 and/or model-training apparatus 246 to generate recommendations 244 related to entity IDs 210, embeddings 220, and/or predictions 222. For example, management apparatus 206 generates recommendations 244 within a job search and/or recruiting tool as search results of job searches by candidates, search results of recruiters' candidate searches for specific jobs, and/or job recommendations that are displayed and/or transmitted to the candidates.

To generate job-related recommendations 244, management apparatus 206 retrieves and/or requests scores 240 from analysis apparatus 204 that represent a candidate's compatibility with a job, the likelihood that the candidate has a positive response to the job, and/or the candidate's strength or quality with respect to requirements or qualifications of the job. Analysis apparatus 204 inputs entity features 210 of multiple sets of entities (e.g., recruiters and candidates, candidates and jobs, recruiters and candidates and jobs, etc.) into a machine learning model, and the machine learning model generates output embeddings 214 and corresponding scores 240 between or among the entities. Management apparatus 206 then generates rankings 242 of jobs and/or candidates by the corresponding scores 240 and outputs recommendations 244 based on rankings 242 (e.g., recommendations 244 of jobs that are most likely to be interesting to a candidate, candidates that are most likely to be interesting to a recruiter, etc.).

By structuring a series of embedding layers 210 in a machine learning model so that the input to one embedding layer includes the concatenated output from all previous layers, the disclosed embodiments allow embedding layers 210 to perform wide learning across various combinations of embedded representations of the input features, as well as deep learning across embedding layers 210. As a result, embeddings outputted by the machine learning model encode additional information that improves the accuracy of subsequent inference using the embeddings. Moreover, the generation of input embeddings 228 with dimensionalities that are proportional to the cardinalities of the corresponding features allows the size of input embeddings 228 to scale with the complexity of the features. Consequently, the disclosed embodiments improve computer systems, applications, user experiences, tools, and/or technologies related to generating embeddings, recommendation systems, feature engineering, and/or machine learning.

Those skilled in the art will appreciate that the system of FIG. 2 may be implemented in a variety of ways. First, analysis apparatus 204, model-training apparatus 246, management apparatus 206, data repository 134, and/or model repository 234 may be provided by a single physical machine, multiple computer systems, one or more virtual machines, a grid, one or more databases, one or more filesystems, and/or a cloud computing system. Analysis apparatus 204, model-training apparatus 246, and management apparatus 206 may additionally be implemented together and/or separately by one or more hardware and/or software components and/or layers. Analysis apparatus 204, model-training apparatus 246, and/or management apparatus 206 may further execute in an offline, online, and/or on-demand basis to accommodate requirements or limitations associated with the processing, performance, or scalability of the system; the availability of outcomes 224 and/or entity features 210 associated with outcomes 224; and/or activity by entities represented by entity features 210.

Second, a number of models and/or techniques may be used to generate entity features 210, input embeddings 228, concatenated outputs 230, output embeddings 214, predictions 222, scores 240, and/or rankings 242. For example, the functionality of analysis apparatus 204 may be implemented using one or more artificial neural networks, regression models, deep learning models, support vector machines, decision trees, random forests, hierarchical models, ensemble models, and/or other types of machine learning models.

Third, the system may be adapted to different types of entities and/or predictions 222. For example, the system may be used to generate output embeddings 214 and/or predictions 222 related to interactions, preferences, similarity, and/or compatibility between or among users, content, locations, animals, advertisements, products, services, service providers, schools, businesses, and/or governments.

Figure 3:
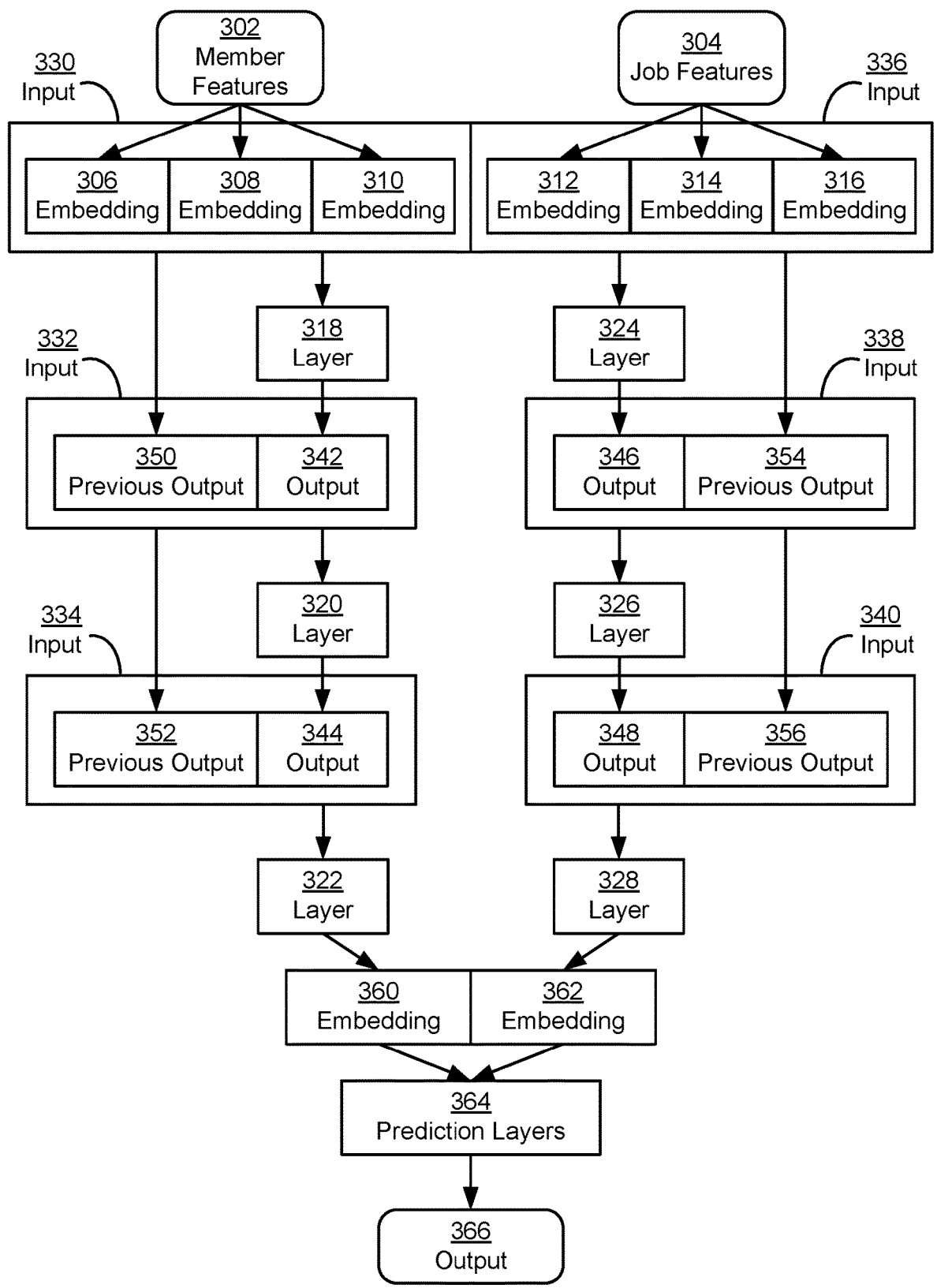
FIG. 3 shows an example machine learning model in accordance with the disclosed embodiments.

FIG. 3 shows an example machine learning model in accordance with the disclosed embodiments. More specifically, FIG. 3 shows a machine learning model that generates embeddings 360-362 from features for entities. The features include member features 302 for one or more members and job features 304 for one or more jobs. For example, member features 302 and job features 304 include, but are not limited to, one or more skills, companies, titles, educational attributes, seniorities, and/or functions for the member(s) and/or job(s).

As shown in FIG. 3, member features 302 are processed using one set of layers 318-322 in the machine learning model, and job features 304 are processed using a different set of layers 324-328 in the machine learning model. Layers 318-322 form a series of embedding layers (e.g., embedding layers 210 of FIG. 2) that generate an output embedding 360 from member features 302, and layers 324-328 form another series of embedding layers that generate an output embedding 362 from job features 304.

First, individual member features 302 are converted into embeddings 306-310 that are used as input 330 to a first embedding layer 318 for member features 302, and individual job features 304 are converted into embeddings 312-316 that are used as input 336 to a first embedding layer 324 for job features 304. For example, an input layer (not shown) processes each member feature and job feature to produce an embedding from the feature, with the size of the embedding selected to be proportional to the cardinality of the feature. Embeddings 306-310 produced by the input layer from member features 302 are concatenated into input 330, and embeddings 312-316 produced by the input layer from job features 304 are concatenated into input 336.

Next, layer 318 processes input 330 to generate output 342, and layer 324 processes input 336 to generate output 346. For example, output 342 and 346 include fixed-length vectors that are generated by layers 318 and 324, respectively, from input 330 and 336, respectively. Output 342 from layer 318 is concatenated with previous output 350 from the input layer (i.e., input 330 into layer 318) to form input 332 into a second embedding layer 320 for member features 302. Similarly, output 346 from layer 324 is concatenated with previous output 354 from the input layer (i.e., input 336 into layer 324) to form input 338 into a second embedding layer 326 for job features 304.

Layer 320 processes input 332 to generate output 344, and layer 326 processes input 338 to generate output 348. For example, output 344 and 348 include fixed-length vectors that are generated by layers 320 and 326, respectively, from input 332 and 338, respectively. Output 344 from layer 320 is concatenated with previous output 352 from layer 318 (i.e., input 332 into layer 320) to form input 334 into a third embedding layer 322 for member features 302. Likewise, output 348 from layer 326 is concatenated with previous output 356 from layer 324 (i.e., input 338 into layer 326) to form input 340 into a third embedding layer 328 for job features 328. As a result, input 334 into layer 322 includes output 344 of layer 320, output 342 of layer 318, and input 330 (i.e., the output generated by the input layer from member features 302). Input 340 into layer 328 includes output 348 of layer 326, output 346 of layer 324, and input 336 (i.e., the output generated by the input layer from job features 304).

Layer 322 then generates an output embedding 360 for member features 302 from input 334, and layer 328 generates an output embedding 362 for job features 304 from input 340. For example, layers 322 and 328 combine inputs 334 and 340, respectively, into vector representations of a lower dimensionality than inputs 334 and 340.

Embeddings 360-362 are concatenated and inputted into one or more prediction layers 364 to generate output 366 of the machine learning model. For example, the machine learning model includes a dense layer that is fully connected to each vector element in the concatenated embeddings 360-362. The machine learning model also includes a softmax layer after the dense layer, which generates output 366 as two or more values representing predicted likelihoods associated with a member and job (e.g., one value representing the likelihood that the member applies to the job and another value representing the likelihood that the member does not apply to the job).

The machine learning model can be trained to generate output 366 that reflects outcomes associated with pairs of members and jobs. For example, errors between likelihoods outputted by the machine learning model and positive or negative outcomes between members and jobs are back-propagated across layers and/or components of the machine learning model. As a result, parameters of layers 318-328, prediction layers 364, and/or the input layer may be updated so that the machine learning model learns to predict the outcomes, given the corresponding member features 302 and job features 304. In turn, measures of "distance" between embeddings 360 and 362 generated by the machine learning model reflect outcomes related to the corresponding entities.

The machine learning model may can be modified to generate embeddings and/or output 366 for different types and/or combinations of input. For example, additional embedding layers may be added to the machine learning model to generate embeddings and/or output 366 for three or more entities based on relationships, preferences, affinities, similarities, and/or interactions among the entities. In another example, each entity is associated with a different number or set of features, so that the numbers and/or dimensionalities of input embeddings produced from the features vary across entities (e.g., a member has four features that result in input embeddings with a total dimensionality of 200, and a job has three features that result in input embeddings with a total dimensionality of 175). Along the same lines, the number of embedding layers and/or the size of each embedding layer may be tailored to the corresponding entity and/or features for the entity (e.g., an embedding for a member is generated by three embedding layers of 150-200 neurons each, and an embedding for a job is generated by two embedding layers of 120-150 neurons each).

Figure 4:
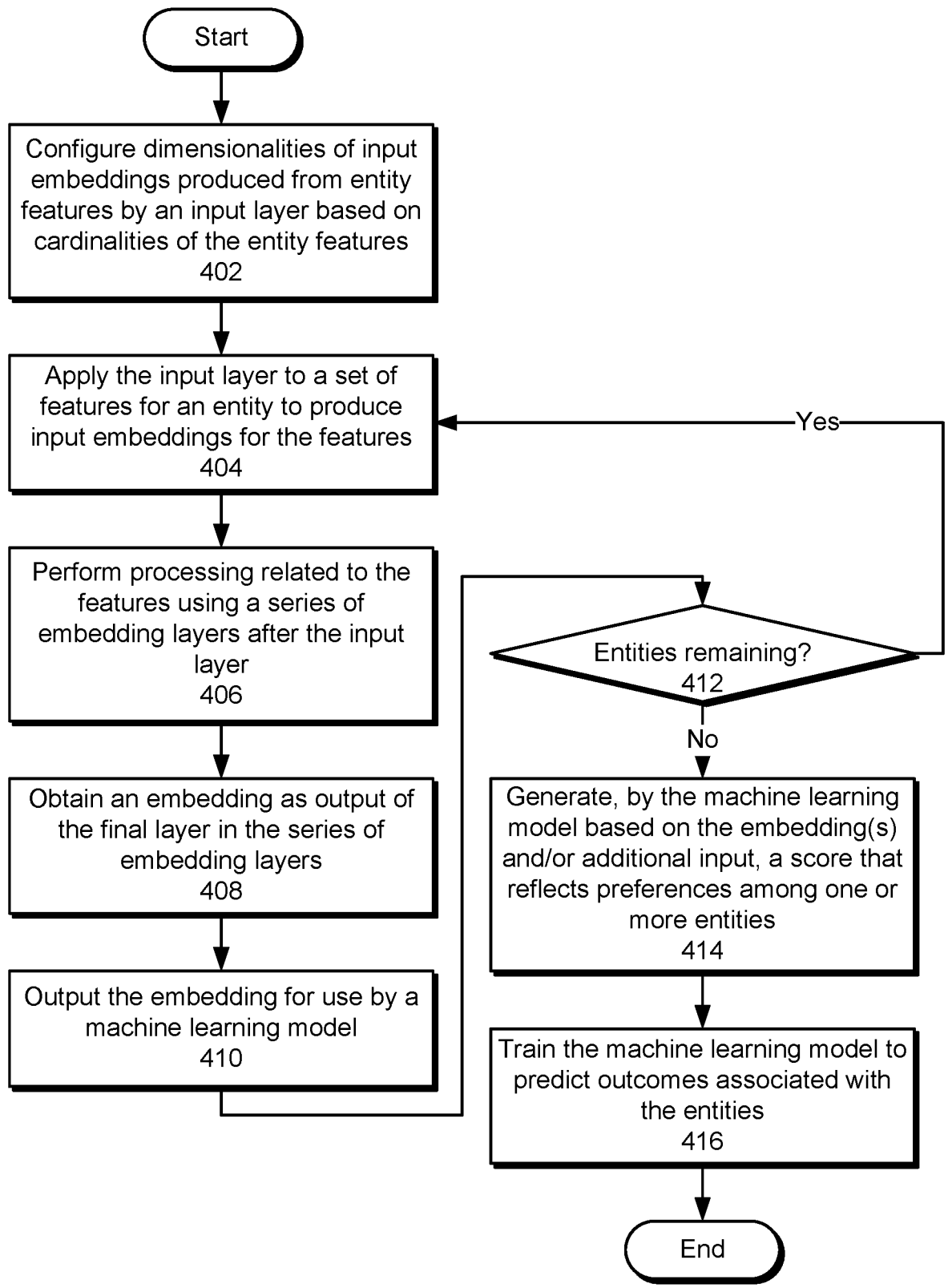
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, dimensionalities of input embeddings produced from entity features by an input layer are configured based on cardinalities of the entity features (operation 402). For example, the dimensionality of a given input embedding is set to be proportional to the square root of the cardinality of the corresponding entity feature.

Next, the input layer is applied to a set of features for an entity to produce the input embeddings for the features (operation 404). For example, the input layer is used to convert one-hot encodings of skills, companies, titles, educational attributes, seniorities, and/or functions of a member or job into corresponding input embeddings.

Processing related to the features is then performed using a series of embedding layers after the input layer (operation 406). For example, input embeddings from the input layer are provided to the first embedding layer, and the first embedding layer generates output from the input embeddings. The output of the first embedding layer is concatenated with the input embeddings to produce input into the second embedding layer, and the second embedding layer generates additional output from the input. The process is optionally repeated, such that the input features are processed by applying each embedding layer in the series of embedding layers to a concatenation of all outputs of all preceding layers.

An embedding is obtained as output of the final layer in the series of embedding layers (operation 408), and the embedding is outputted for use by a machine learning model (operation 410). For example, the embedding is stored as a vector representation of the corresponding entity and/or inputted into the machine learning model.

Operation 402-410 may be repeated for remaining entities (operation 412). For example, embeddings of member features for a member may be produced using one set of input and embedding layers, embeddings of job features for a job may be produced from another set of input and embedding layers, and embeddings of company features for a company may be produced from a third set of input and embedding layers.

A score that reflects preferences among one or more entities is then generated by the machine learning model based on the outputted embedding(s) and/or additional input (operation 414). For example, the machine learning model outputs one or more values representing likelihoods of interaction between and/or among members, jobs, and/or companies based on embeddings representing the members, jobs, and/or companies and/or additional features associated with the members, jobs, and/or companies.

The machine learning model is additionally trained to predict outcomes associated with the entities (operation 414). For example, parameters in the machine learning model for generating the embeddings from the entity IDs are updated so that "distances" between the embeddings in a vector space reflect the outcomes. In another example, additional parameters in the machine learning model for calculating the output from the embedding and/or the additional input are updated based on the outcome. During training of the machine learning model, the size of an update to the parameters is selected based on a weight associated with the outcome. Thus, an outcome with a greater severity or impact (e.g., dismissing a job) has a greater effect on the parameters than an outcome with a lower severity or impact (e.g., skipping or ignoring a job).

Figure 5:
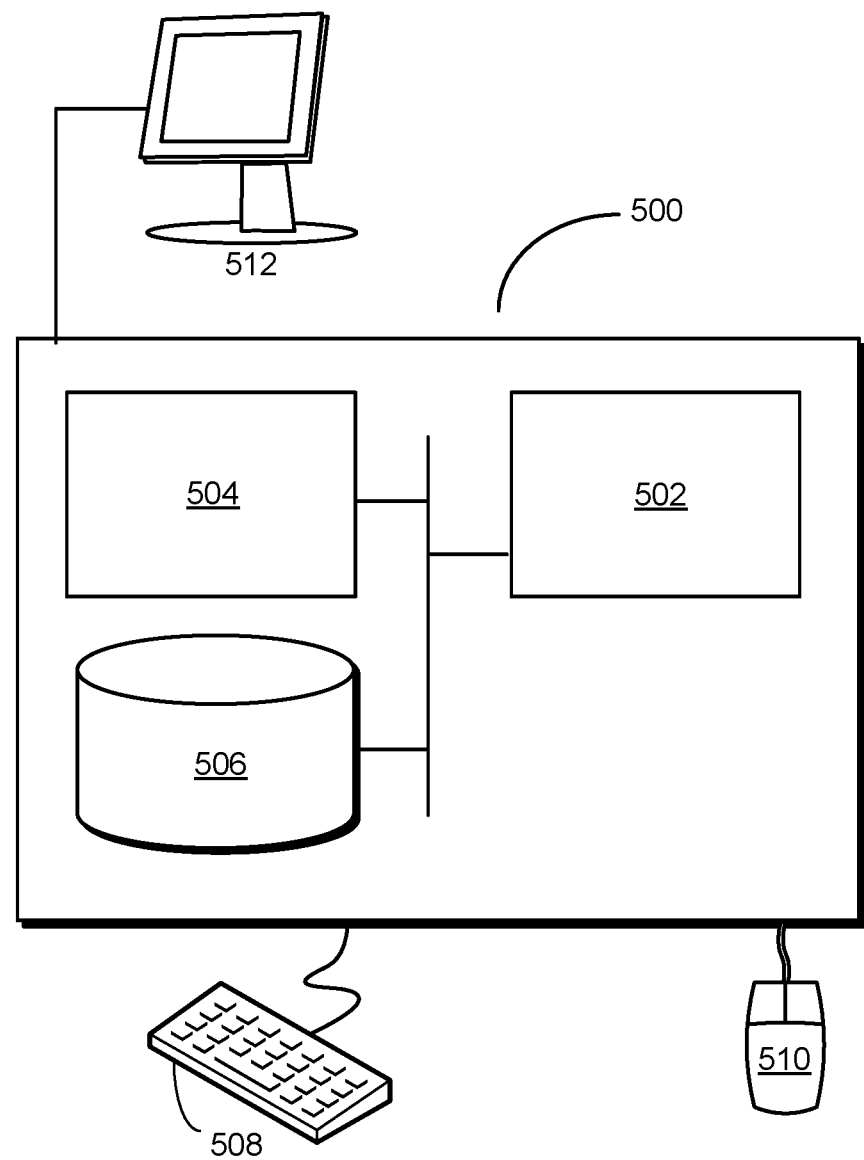
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes an analysis apparatus, a model-training apparatus, and a management apparatus, one or more of which may alternatively be termed or implemented as a module, mechanism, or other type of system component. The analysis apparatus performs processing related to a first set of features for a first entity using a first series of embedding layers, which includes applying each embedding layer in the first series of embedding layers to a concatenation of all outputs of one or more layers preceding the embedding layer. Next, the analysis apparatus obtains a first embedding as an output of a first final layer in the first series of embedding layers. The analysis apparatus then outputs the first embedding for use by a machine learning model.

The model-training apparatus trains the machine learning model to predict an outcome associated with the first entity and a second entity based on the first embedding and additional input. The management apparatus then uses the machine learning model to generate, based on the first embedding and additional input, a score that reflects a preference of the first entity for a second entity represented by the additional input. Finally, the management apparatus outputs a recommendation related to the first and second entities based on the score.

In addition, one or more components of computer system 500 may be remotely located and connected to the other components over a network. Portions of the present embodiments (e.g., analysis apparatus, model-training apparatus, management apparatus, data repository, model repository, online network, etc.) may also be located on different nodes of a distributed system that implements the embodiments. For example, the present embodiments may be implemented using a cloud computing system that generates embeddings and/or predictions for a set of remote entities.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer implemented method, comprising:
   providing a first machine learning model comprising:
   an input layer that generates a first set of features for an entity;
   a first plurality of embedding layers applied sequentially to process data, wherein a first embedding layer, from the first plurality of embedding layers, is configured to receive as input the first set of features for the entity and output a first embedding, wherein embedding layers after the first embedding layer receive as input a concatenation of an input to the previous layer and an output from the previous layer, the second embedding layer receiving as input the concatenation of the input of the first set of features for the entity and the first embedding, the third embedding layer receiving as input the concatenation of the input to the second embedding layer and the output of the second embedding layer, the output of the last embedding layer being a final embedding for the first set of features for the entity; and
   at least one first prediction layer configured to receive as input the final embedding for the first set of features and generate an output that is a prediction;
   training the first machine learning model using a training set with values for the first set of features; and
   utilizing the trained first machine learning model to make a prediction based on input values for the set of features for a first entity.

2. The method of claim 1, wherein utilizing the trained machine learning model to make a prediction further comprises:
   generating, by the machine learning model based on the first embedding and an additional input of a second entity, a score that reflects a preference of the first entity for the second entity.

3. The method of claim 1, wherein training the machine learning model comprises:
   updating parameters in the first plurality of embedding layers for generating the final embedding for the first set of features.

4. The method of claim 1, wherein training the machine learning model comprises:
   updating parameters in the at least one first prediction layer.

5. The method of claim 2, further comprising:
   providing a second machine learning model comprising a second plurality of embedding layers for a second set of features for the second entity, and at least one second prediction layer;
   obtaining, utilizing the second machine learning model, a second final embedding; and
   utilizing the second final embedding as in input for the at least one second prediction layer.

6. The method of claim 2, further comprising:
   outputting a recommendation related to the first entity and the second entity based on the score.

7. The method of claim 6, wherein outputting the recommendation comprises:
   including a job represented by the second entity in a ranking of jobs that is outputted to a member represented by the first entity.

8. The method of claim 1, further comprising:
   configuring, based on respective cardinalities of the first set of features, dimensionalities of input embeddings for the first set of features.

9. The method of claim 1, wherein the first set of features comprises at least one of:
   a skill;
   a company;
   a title;
   an educational attribute;
   a seniority; or
   a function.

10. The method of claim 1, wherein the entity comprises at least one of:
    a member;
    a job;
    a company; or
    a content item.

11. A system, comprising:
one or more processors; and
memory storing instructions that, when executed by the one or more processors, cause the system to:
provide a first machine learning model comprising:
an input layer that generates a first set of features for an entity;
a first plurality of embedding layers applied sequentially to process data, wherein a first embedding layer, from the first plurality of embedding layers, is configured to receive as input the first set of features for the entity and output a first embedding, wherein embedding layers after the first embedding layer receive as input a concatenation of an input to the previous layer and an output from the previous layer, the second embedding layer receiving as input the concatenation of the input of the first set of features for the entity and the first embedding, the third embedding layer receiving as input the concatenation of the input to the second embedding layer and the output of the second embedding layer, the output of the last embedding layer being a final embedding for the first set of features for the entity; and
at least one first prediction layer configured to receive as input the final embedding for the first set of features and generate an output that is a prediction;
train the first machine learning model using a training set with values for the first set of features; and
utilize the trained first machine learning model to make a prediction based on input values for the set of features for a first entity.

12. The system of claim 11, wherein the memory further stores instructions that, when executed by the one or more processors, cause the system to:
provide a second machine learning model comprising a second plurality of embedding layers for a second set of features for a second entity, and at least one second prediction layer;
obtain, utilizing the second machine learning model, a second final embedding; and
utilize the second final embedding as in input for the at least one second prediction layer.

13. The system of claim 12, wherein utilizing the trained machine learning model to make a prediction further comprises:
generate, by the machine learning model based on the first embedding and an additional input of a second entity, a score that reflects a preference of the first entity for the second entity; and
output a recommendation related to the first entity and the second entity based on the score.

14. A non-transitory computer-readable storage medium storing instructions that when executed by a computer cause the computer to perform a method, the method comprising:
providing a first machine learning model comprising:
an input layer that generates a first set of features for an entity;
a first plurality of embedding layers applied sequentially to process data, wherein a first embedding layer, from the first plurality of embedding layers, is configured to receive as input the first set of features for the entity and output a first embedding, wherein embedding layers after the first embedding layer receive as input a concatenation of an input to the previous layer and an output from the previous layer, the second embedding layer receiving as input the concatenation of the input of the first set of features for the entity and the first embedding, the third embedding layer receiving as input the concatenation of the input to the second embedding layer and the output of the second embedding layer, the output of the last embedding layer being a final embedding for the first set of features for the entity; and
at least one first prediction layer configured to receive as input the final embedding for the first set of features and generate an output that is a prediction;
training the first machine learning model using a training set with values for the first set of features; and
utilizing the trained first machine learning model to make a prediction based on input values for the set of features for a first entity.

15. The non-transitory computer-readable storage medium of claim 14, wherein the first entity is a member profile, the method further comprising:
predicting, by the machine learning model, an outcome associated with the member profile and a job.

\* \* \* \* \*